United States Patent [19]

Linn

[11] Patent Number: 5,078,353
[45] Date of Patent: Jan. 7, 1992

[54] SUPPORT FOR CIRCULAR SAWS AND SIMILAR TOOLS

[76] Inventor: Christopher Linn, 274 Tyler Ct., Libertyville, Ill. 60048

[21] Appl. No.: 502,405

[22] Filed: Mar. 30, 1990

[51] Int. Cl.[5] ............................................. A47F 5/00
[52] U.S. Cl. ................................. 248/166; 211/70.6; 248/449; 248/460
[58] Field of Search ............... 248/166, 172, 676, 449, 248/460, 447; 211/70.6; 83/574

[56] References Cited

U.S. PATENT DOCUMENTS

| | | | |
|---|---|---|---|
| 381,766 | 4/1888 | Deuther | 248/166 X |
| 486,549 | 11/1892 | Terslose | 248/449 |
| 728,653 | 5/1903 | Anthony | 248/449 |
| 1,955,509 | 4/1934 | Moeckel | 248/166 X |
| 2,016,421 | 10/1935 | Eichner | 211/70.6 |
| 2,401,811 | 6/1946 | Atticks | 248/460 |
| 2,733,113 | 1/1956 | Humbarger | 211/70.6 X |
| 2,867,917 | 1/1959 | Carlton | 248/166 X |
| 3,830,130 | 8/1974 | Moore . | |
| 4,050,340 | 9/1977 | Flanders . | |
| 4,365,720 | 12/1982 | Kaneshiro | 211/70.6 |
| 4,555,084 | 11/1985 | Anderson et al. | 248/460 |

FOREIGN PATENT DOCUMENTS 471041  8/1937  United Kingdom ................. 248/460

Primary Examiner—Karen J. Chotkowski
Attorney, Agent, or Firm—Lockwood, Alex, Fitzgibbon & Cummings

[57] ABSTRACT

A free-standing, portable support assembly for a hand-held powered saw or tool includes two angled hingedly interconnected support members. At least one of the two support members has a longitudinal tool support surface thereon which is disposed proximate to a saw blade or tool receiving element receiving opening. Adjustable stop means which has an upright force is also disposed proximate the opening and engages an edge of the saw or tool to retain it on the longitudinal support surface.

20 Claims, 1 Drawing Sheet

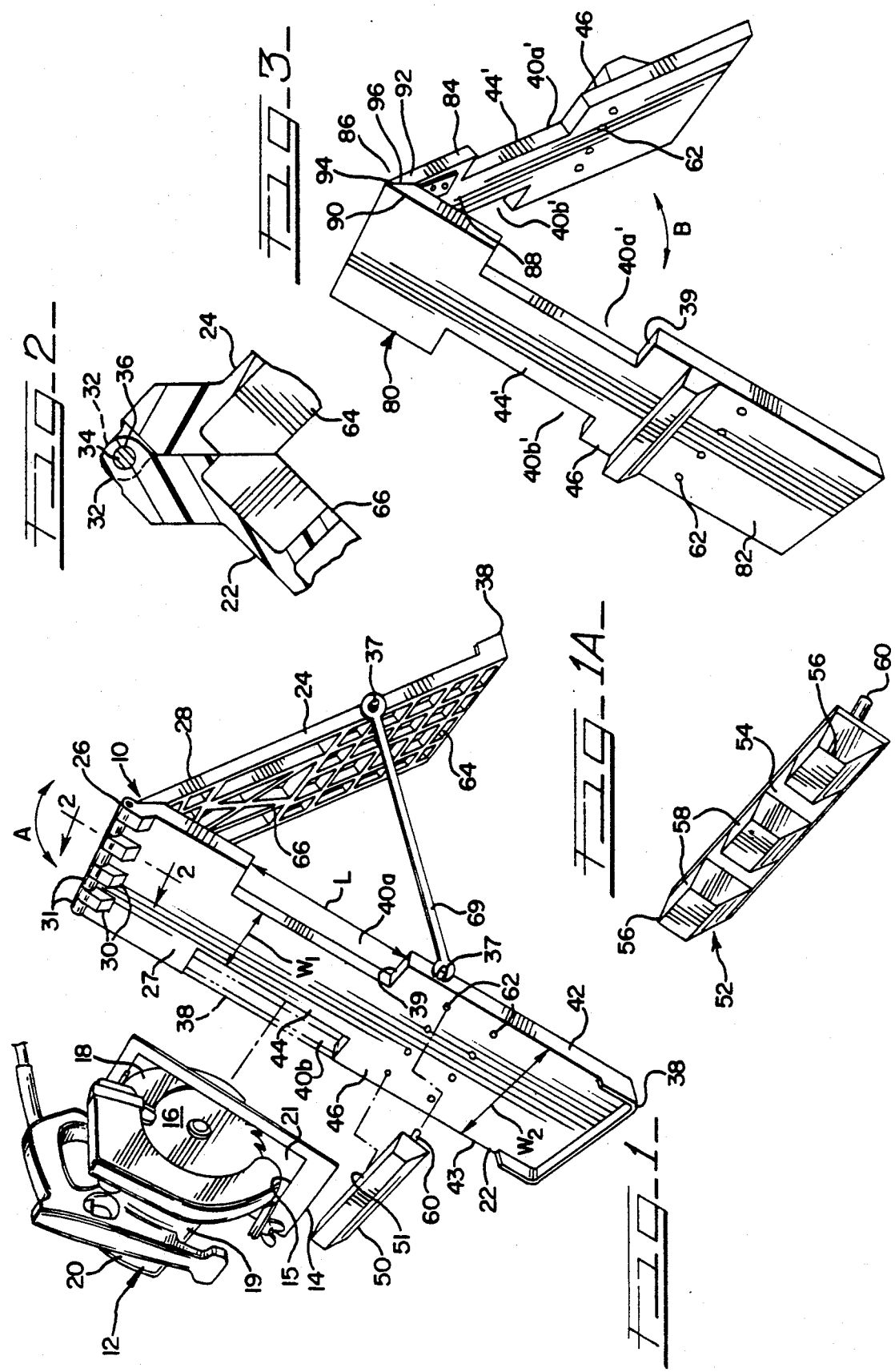

SUPPORT FOR CIRCULAR SAWS AND SIMILAR TOOLS

BACKGROUND AND SUMMARY OF THE INVENTION

The present invention relates generally to supports for power tools and, more particularly, to a free-standing, portable support for a handheld circular saw.

Portable circular saws are used in a variety of applications by both amateurs and professional tradesmen. Quite often, these circular saws are used by carpenters during the rough framing of residential and light industrial construction. Most of such rough framing is accomplished through the use of standard length 2"×4" wood lumber studs which are cut down to various preselected sizes and assembled together to form individual walls and the like. Often during the framing process a carpenter must cut various pieces of lumber to many different preselected sizes at many times during a day. After a particular wooden stud is cut to size, the carpenter usually places his circular saw down on the flooring of the structure and sets and nails the stud into place. This cycle is repeated throughout the day, and thus the carpenter is easily fatigued by his continuous bending down to pick up and set down his circular saw.

Although a large work table can be used for cutting the stud and holding the same, the table is large and is typically set up in only one location within the structure. Such a table will provide a support surface for the circular saw, but other workers, when it is time for them to use the work table may move the carpenter's circular saw off of the work table. At the table height, the saw is also prone to be knocked off by workers and damaged. Additionally, the work table supports the circular saw by direct contact with the saw blade, thereby increasing the need for frequent sharpening of the saw blade.

Apart from the use of bulky work table, the carpenter is often prone to rest his circular saw down on the sill of rough window openings. However, the sill support surface is typically only equal to the width of a dressed 2"×4" stud, i.e., 3½ inches wide. This width is insufficient to support the circular saw without careful placement of the saw onto the sill. Additionally, the saw teeth will engage the sill surface, and the circular saw is in danger of being damaged if it falls or is knocked off the sill.

Accordingly, it is an object of the present invention to provide a support assembly for a free-standing portable circular saw or other similar tool which reliably supports the saw near to the user.

Another object of the present invention is to provide a support for a portable circular saw or other similar hand held tool which reliably supports the tool on a support surface without having the blade of the tool contact a surface of the support.

A further object of the present invention is to provide a free-standing, portable power saw support assembly which easily supports right-handed or left-handed power saws on an angled support surface without the saw blade contacting the support surface.

Yet another object of the present invention is to provide a free-standing portable power hand saw support assembly having two support members hinged together at the apex of the support assembly, each of the two support members having at least one opening therein which receive a saw blade, each of the two support members having a second, adjustable saw-retaining means.

Still another object of the present invention is to provide a portable, lightweight circular saw support assembly which is injection molded from a durable and high strength molding material, the saw assembly including two saw support legs hinged together at a center point and adapted for angled movement with respect to each other, the saw support legs each having a saw support surface thereon, the saw support surface including an opening adapted to receive the saw blade of the circular saw, the saw support surface further including first and second saw support portions and saw retaining means capable of adjustable placement on the saw support surfaces.

These and other objects, features and advantages of the present invention will be apparent from the following detailed description, taken in conjunction with the accompanying drawings wherein like reference numerals refer to like parts.

BRIEF DESCRIPTION OF THE DRAWINGS

In the course of this detailed description, reference will be made to the attached drawings in which:

FIG. 1 is a perspective view of a support assembly for a circular saw constructed in accordance with the principles of the present invention;

FIG. 1A is a perspective detail of an alternative adjustable support means;

FIG. 2 is a partial sectional view of the saw support assembly of FIG. 2 taken along lines 2—2; and FIG. 3 is a perspective view of an alternate embodiment of a circular saw support constructed in accordance with the principles of the present invention.

DETAILED DESCRIPTION OF THE INVENTION

FIG. 1 illustrates a powered tool support assembly 10 constructed in accordance with the principles of the present invention. For purposes of illustration, FIG. 1 shows a powered circular saw 12 used with the support assembly 10, although it will be appreciated that the present invention may also accommodate sabre saws and other similar tools having a projecting tool element, such as a saw blade. The circular saw 12 has a generally rectangular, flat base portion 14 having an opening 15 through which the saw blade 16 projects. The saw base portion 14 can be considered as having two distinct components, a motor portion 19, which is relatively large and over which the heavy saw motor 20 is mounted and an adjacent blade portion 21. When set down on a level surface, the saw has a tendency to tilt toward the motor portion 19. The saw 12 may or may not contain a spring-biased arcuate saw blade guard 18.

The support assembly 10 includes two saw support members 22 and 24, each of which has a generally planar outer surface 27, 28. The first saw support member 22 is interconnected to the second saw support member 24 by hinge means illustrated in FIGS. 1 and 2 as a plurality of integral, interlocking hinge members 30, 31, which include integral hinge lugs 32, each having a central opening 34 which receives an elongated hinge pin 36. The hinge means allows the first and second saw support members 22, 24 to be stood upright on a generally horizontal surface so that the outer planar surfaces thereof 27 and 28 are angled upwardly and outwardly toward the carpenter or tool user when the support assembly 10 is in a supporting position as shown in FIG. 1. The hinge means further allows the two support members 22, 24 to be rotated towards each other, as shown by arrows A and B in FIGS. 2 and 3, respectively such that the two support members 22, 24 may be folded together to allow the support assembly to be easily transported and stored. The hinge means also defines the apex 26 of the saw support assembly 10 when the first and second support members 22 and 24 are set up in their upright supporting position.

The first and second support members 22, 24 are generally rectangular in shape and as shown in FIG. 1, each may include a lateral extension or foot member 38 disposed at the lower ends thereof to provide the assembly 10 with a bottom support surface and increased stability.

One or more of the respective outer planar surfaces 27 and 28 of the first and second support members 22 and 24 include a first or longitudinal support surfaces 44 which are disposed thereon proximate to and closely adjacent to the saw blade openings 40a and 40b. The longitudinal support surfaces 44, 44' support the saw motor portion 19 of the circular saw flat base portion 14. Preferably, the width, $W_1$, of the longitudinal support surface 44 has a preselected width: $W_1$, which will reliably accommodate and support the saw motor portion 19. In this regard, a width of approximately 4 inches has been found to give particularly desirable results.

Importantly, as seen in the alternate embodiment illustrated in FIG. 3, one or both of the first and second support members 82 and 84 may include one or more generally rectangular saw blade openings 40a, 40b, 40a' and 40b' which are dimensioned to freely receive the saw blade portion 21 which projects downwardly through the saw base opening 15 such that the saw blade does not contact the inner walls 39 of the saw blade openings. The saw blade openings therefore receive either the projecting saw blade 16 or saw blade guard 18 or the projecting tool element where the supported tool is not a circular saw. A preferred dimension of the saw blade opening length, L is approximately 7 inches.

Although the saw blade openings 40a–40b' are illustrated in FIGS. 1 and 3 as located along the edges 42, 43 of the support members 22, 24 it will be appreciated that the saw blade openings 40a–40b' can be centrally disposed in the support member itself between the two opposing edges 42 and 43 thereof. In this regard, the opening 40 may be disposed in the general central portion of either the first or second support member 22 or 24 such that a longitudinal support surface is formed closely adjacent to the openings 40a, 40b. Alternatively, the saw blade opening 40a may be disposed to one side such that a thin slat 38, (shown in phantom in FIG. 1), completes the opening. Additionally, although the embodiments illustrated in FIGS. 2 and 3 show two and four saw blade openings, respectively, it will be understood that the present invention may have one or multiple saw blade openings present in anyone or both of the first and second support members. One particular advantage to the embodiment shown in FIG. 1 is that where the first support member 22 has two saw blade openings 40a, 40b disposed on opposite sides of the same longitudinal support surface 44, it enables the first support member 22 to easily accommodate right-handed or left-handed saws.

Disposed beneath the saw openings 40a, 40b and generally adjacent thereto is a second or lateral support surface 46 which reliably accommodates the trailing portion 17 of the saw base 14. Many saws are equipped with curved spring-biased saw guards 18, the curved surface of which may tend urge the saw 12 out of the saw openings 40a, 40b. Accordingly, the saw assembly 10 includes means for retaining the saw 12 in place upon the saw support member planar surfaces 27 and 28. The saw retaining means serves two purposes. Firstly, it retains the saw 12 on the longitudinal and lateral support surfaces 44, 46 and secondly, it prevents the saw 12 from working itself out of the saw blade openings 40a, 40b. The retaining means is illustrated in FIG. 1 as a generally elongated stop member 50 which has a raised profile of a preselected height when in place upon the first or second support member 22, 24. The stop member 50 has a substantially normal face 51 designed to engage an edge of the saw 12. The stop member 50 desirably has a length equal to substantially the entire width, $W_2$, of the support member 22, or it can have a length equivalent to at least one-half of the support member width $W_2$.

An alternative construction of a stop member 52 is illustrated in FIG. 1A, wherein the stop member 52 has a elongated base portion 54 and three upwardly projecting lugs 56, each presenting a substantially normal face 58 to the trailing edge of portable saw 12.

In order to accommodate saws of varying lengths and decrease the likelihood of the saw blade contacting any portion of the support assembly 10, the saw retaining means 50, 52 has a group of engagement studs 60 projecting therefrom which engage a series of groups of holes 62 on the support member 22. Each group of holes 62 is at a different height along the lateral support surfaces 46, 46' so that the retaining means feature of the saw support assembly 10 is easily adjustable.

The present invention 10 lends itself to being easily manufactured by injection molding. In such instance, the weight of the support members 22, 24 can be greatly reduced and the strength thereof increased by way of a "honeycomb" pattern 64 which includes various vertical, horizontal and angled bracing 66. Alternately, as illustrated in FIG. 3, the support assembly 80 can be formed from two pieces of wood 82, 84 and interconnected at their apex 86 by a separate hinge 88. In order to limit the rotation of the first and second support members 82, 84 around the hinge 88, the top ends 90, 92 of the support members 82, 84 are angled to provide two confronting faces 94, 96 which abuttingly engage each other when the support assembly 80 is set up and prevent the support members 82, 84 from spreading any further. These abutments also define the preferred angular displacement 0 of the support members, 82 and 84, which is approximately 60°. Where the hinge 30a, 30b is integrally formed with the support members 22 and 24 as shown in the embodiment of FIG. 2, such confronting faces may be formed in the support member ends when the hinge lugs 32 are formed on the underside of the two support members 22, 24, or where the hinge lugs 32 are formed as shown, a tie member 69, such as an elastomeric strap or chain may be provided which is attached to two studs 37 located on the edges of the first and second support members 22 and 24.

Finally it will be understood the above description of the present invention is merely illustrative of a few applications of the principles of the invention. Numerous modifications may be made by those skilled in the art without departing from the true spirit and scope of the invention.

I claim:

1. A free-standing, portable support assembly for a powered tool having a generally flat base portion, a generally flat end portion angularly disposed with respect to said tool flat base portion and a tool element which projects outwardly past the tool flat base portion, the support assembly comprising: first and second tool support members being rotatably connected together at an apex thereof, said two support members being angularly displaced with respect to each other, said first support member having at least one tool element opening therein adapted to receive the projecting element of the powered tool therein, said tool element opening having a width which is substantially less than the width of said first support member, said first support member having at least two distinct tool support surface thereon for supporting two different portions of said tool, the first of said tool support surfaces being a longitudinal tool support surface disposed adjacent and proximate to said opening, the longitudinal tool support surface forming a substantially flat plane substantially abutting said tool element opening which is adapted to support said substantially flat tool base portion, said first support member further including adjustable stop means disposed on the longitudinal tool support surface proximate to said opening, the adjustable stop means defining a second of said two tool support surfaces which is a lateral tool support surface disposed generally adjacent to and angularly disposed with respect to said longitudinal tool support surface, said lateral tool support surface being adapted to support said tool flat end portion, said adjustable stop means further being adapted to engage said first support member at a plurality of positions, said first and second support members being adapted to be supported by a generally horizontal surface.

2. The powered tool support assembly of claim 1, wherein said adjustable stop means includes an elongated member extending across at least one half of the width of said longitudinal support surface, said elongated member having one or more raised portions, the one or more raised portions each having a substantially planar face which is generally normal to the plane of said longitudinal tool support surface.

3. The powered tool support assembly of claim 2, wherein said elongated member has at least two distinct raised portions.

4. The powered tool support assembly of claim 1, wherein said opening is generally rectangular and is disposed in said first support member in a first side thereof.

5. The powered tool support assembly of claim 1, wherein said at least first and second support members are an injection molded plastic and said first and second support members further include hinge means integrally molded therewith and disposed at the apex thereof.

6. The powered tool support assembly of claim 1, wherein said second support member includes a second support member opening adapted to receive the projecting portion of a powered tool therein, said second support member having a second longitudinal support surface proximate to said second support member opening, said second support member also including adjustable stop means disposed on the second longitudinal tool support surface which is adapted to engage said second support member at a plurality of positions.

7. The powered tool support assembly of claim 1, wherein said first and second members include outwardly extending foot members at the ends of said first and second support members opposite the apex thereof.

8. The powered tool support assembly of claim 1, wherein said opening is generally rectangular and is disposed between two opposing sides of said first support member.

9. The powered tool support assembly of claim 1, further including means for limiting the movement of said first and second support members relative to each other.

10. The powered tool support assembly of claim 9, wherein said movement limiting means includes two confronting faces disposed on said first and second support members near said apex thereof, the two confronting faces abuttingly engaging each other when said support assembly is set up.

11. A free-standing, portable assembly for supporting an electrically powered saw of the type which has a projecting saw blade the support assembly comprising first and second saw support members, means for interconnecting the first and second support members together at an apex thereof, means for supporting said first and second support members on a generally horizontal surface, said first support member including a first saw blade opening adapted to receive the projecting saw blade, said first support member further including a major longitudinal support surface disposed thereon proximate to and generally adjacent to the first saw blade opening and a minor lateral support surface disposed thereon proximate to and generally adjacent to said first saw blade opening, the minor lateral support surface being angularly disposed on said first support member with respect to the major longitudinal support surface, said first support member further including means for retaining said saw on said support assembly, the saw retaining means including an elongated stop member adjustably mounted on said support assembly, the elongated stop member extending across a portion of said first support member, said elongated stop member having at least one upright projection with a face disposed substantially normal to the plane of said major longitudinal support surface, the face being adapted to engage an edge of said powered saw, said first support member further including a second saw blade opening adapted to receive a projecting saw blade therein, said first and second saw blade openings being disposed closely adjacent to opposite sides of said first support member, said saw retaining means also being disposed proximate to said first and second saw blade openings.

12. The portable saw support assembly of claim 11, wherein said stop member includes two upright projections, each of the projections having a saw engaging face thereon.

13. The portable saw support assembly of claim 11, wherein said first and second support member interconnecting means includes hinge means disposed on an end of each of said first and second support members at an apex thereof, said first and second support members further including means for limiting the relative movement of said first and second support members about said interconnecting means, said movement limiting means including two confronting end faces which abuttingly engage each other and which restrict the rotation of said first and second support members around said hinge means to a preselected displacement.

14. The portable saw support assembly of claim 11, wherein said first saw blade opening is generally rectangular and is disposed between two opposing sides of said first support member.

15. The portable saw support assembly of claim 11, wherein said first and second saw blade openings are generally rectangular.

16. The portable saw assembly of claim 11, wherein said first and second saw support members includes means for limiting the relative movement of said first and second members about said first and second support member interconnecting means, the movement limiting means including a tie member extending between said first and second support members, said tie member being disposed beneath said support assembly apex.

17. The portable saw assembly of claim 11, wherein said second support member includes a third saw blade opening adapted to receive said projecting saw blade, said second support member also including a major longitudinal support surface disposed thereon proximate to and generally adjacent to the third saw blade opening and a minor lateral support surface disposed thereon proximate to and generally adjacent to said third saw blade opening, said second support member also including means for retaining said saw on said support assembly.

18. The portable saw assembly of claim 11, wherein said second support member includes a third saw blade opening adapted to receive a projecting saw blade therein, the third saw blade opening being generally rectangular and being disposed proximate a second support member major longitudinal support surface, said second support member also including means for retaining said saw or said support assembly.

19. In a free-standing, portable support assembly for supporting one or more hand held powered tools of the type having a generally flat base portion, an edge portion and a tool element which projects past the base portion, the improvement comprising, in combination:

first and second support members which are adapted to be supported by a generally horizontal surface, the first and second support members being moveably connected at an apex thereof, said first and second support members being angularly oriented with respect to each other when set up in a tool supporting position;

said first support member having a first longitudinal tool support surface adapted to support the generally flat base portion of said tools, a first tool element opening disposed generally proximate to the first longitudinal tool support surface, the first tool element opening being adapted to receive the projecting tool element therein, a first lateral tool support surface also disposed proximate to said first tool element opening, the first lateral tool support surface being adapted to support a portion of said tool generally flat base portion and a first elongated stop member having an upright projecting edge with a first stop surface thereon adapted to engage the tool edge portion;

said second support member having a second longitudinal tool support surface adapted to support the generally flat base portion of said tools, a second tool element opening disposed generally proximate to the second longitudinal tool support surface, the second tool element opening being adapted to receive said projecting element of said tools therein, a second lateral tool support surface also disposed proximate to said second tool element opening, the second lateral tool support surface being adapted to support a portion of said tool generally flat base portion and a second elongated stop member having an upright projecting edge with a second stop surface thereon adapted to engage the tool edge portion;

hinge means disposed on said first and second support members proximate to the apex of the support assembly, the hinge means rotatably connecting said first and second support members; and means for limiting the rotation of said first and second support members relative to each other.

20. A free-standing, portable support assembly for a powered tool having a generally flat base portion, a generally flat end portion angularly disposed with respect to said tool flat base portion and a tool element which projects outwardly past the tool flat base portion, the support assembly comprising: first and second tool support members, the first and second support members being rotatably connected together at an apex thereof, said at least two support members being angularly displaced with respect to each other, said first support member having at least one tool element opening therein adapted to receive the projecting element of the powered tool therein, said first support member having at least two, distinct tool support surfaces thereon for supporting two different portions of said tool, the first of said tool support surfaces being a longitudinal tool support surface disposed adjacent and proximate to said opening, the longitudinal tool support surface forming a substantially flat plane substantially abutting said tool element opening which is adapted to support said substantially flat tool base portion, said first support member further including adjustable stop means disposed on the longitudinal tool support surface proximate to said opening, the adjustable stop means defining a second of said two tool support surfaces which is a lateral tool support surface disposed generally adjacent to and angularly disposed with respect to said longitudinal tool support surface, said lateral tool support surface being adapted to support said tool flat end portion, said adjustable stop means further being adapted to engage said first support member at a plurality of positions, said first and second support members being adapted to be supported by a generally horizontal surface wherein said opening is generally rectangular and is disposed in said first support member in a first side thereof, and said first support member includes another opening adapted to receive the projecting portion of a powered tool therein, the another opening being disposed in said first support member in a second side thereof and generally opposite the first support member first side, said longitudinal tool support surface being disposed between said opening and said another opening, and said adjustable stop means includes an elongated member extending partially between said first and second sides of said first support member, the elongated member having one or more upright projections each having a substantially planar face generally normal to the longitudinal tool support surface, to provide a second tool engagement surface.

* * * * *